United States Patent [19]

Hawke

[11] Patent Number: 4,587,084

[45] Date of Patent: May 6, 1986

[54] CONTROL ROD DRIVE

[75] Inventor: Basil C. Hawke, Solana Beach, Calif.

[73] Assignee: The United States of America as represented by the United States Department of Energy, Washington, D.C.

[21] Appl. No.: 526,349

[22] Filed: Aug. 24, 1983

[51] Int. Cl.$^4$ ............................................... G21C 9/02
[52] U.S. Cl. ..................... 376/336; 376/219; 376/232; 376/234; 185/33
[58] Field of Search ............... 376/219, 228, 232, 234, 376/277, 327, 383, 463, 366, 370, 207, 224, 225, 336, 347; 185/33; 74/216.3

[56] References Cited

U.S. PATENT DOCUMENTS

| | | | |
|---|---|---|---|
| 685,269 | 10/1901 | Fulton | 185/33 |
| 971,482 | 9/1910 | Anthony | 185/33 |
| 1,565,031 | 12/1925 | Strout | 185/33 |
| 3,152,960 | 10/1964 | Alfred | 376/228 |
| 3,980,519 | 9/1976 | Taft | 376/225 |
| 4,073,681 | 2/1978 | Glazar et al. | 376/336 |
| 4,221,137 | 9/1980 | Futaba | 74/216.3 |

OTHER PUBLICATIONS

*Nuclear Energy Technology,* McGraw-Hill Book Co., 1981, p. 308, Knief.

Primary Examiner—Charles T. Jordan
Assistant Examiner—Richard Klein
Attorney, Agent, or Firm—Fitch, Even, Tabin & Flannery

[57] ABSTRACT

A control rod drive uses gravitational forces to insert one or more control rods upwardly into a reactor core from beneath the reactor core under emergency conditions. The preferred control rod drive includes a vertically movable weight and a mechanism operatively associating the weight with the control rod so that downward movement of the weight is translated into upward movement of the control rod. The preferred control rod drive further includes an electric motor for driving the control rods under normal conditions, an electrically actuated clutch which automatically disengages the motor during a power failure and a decelerator for bringing the control rod to a controlled stop when it is inserted under emergency conditions into a reactor core.

9 Claims, 3 Drawing Figures

U.S. Patent    May 6, 1986    4,587,084
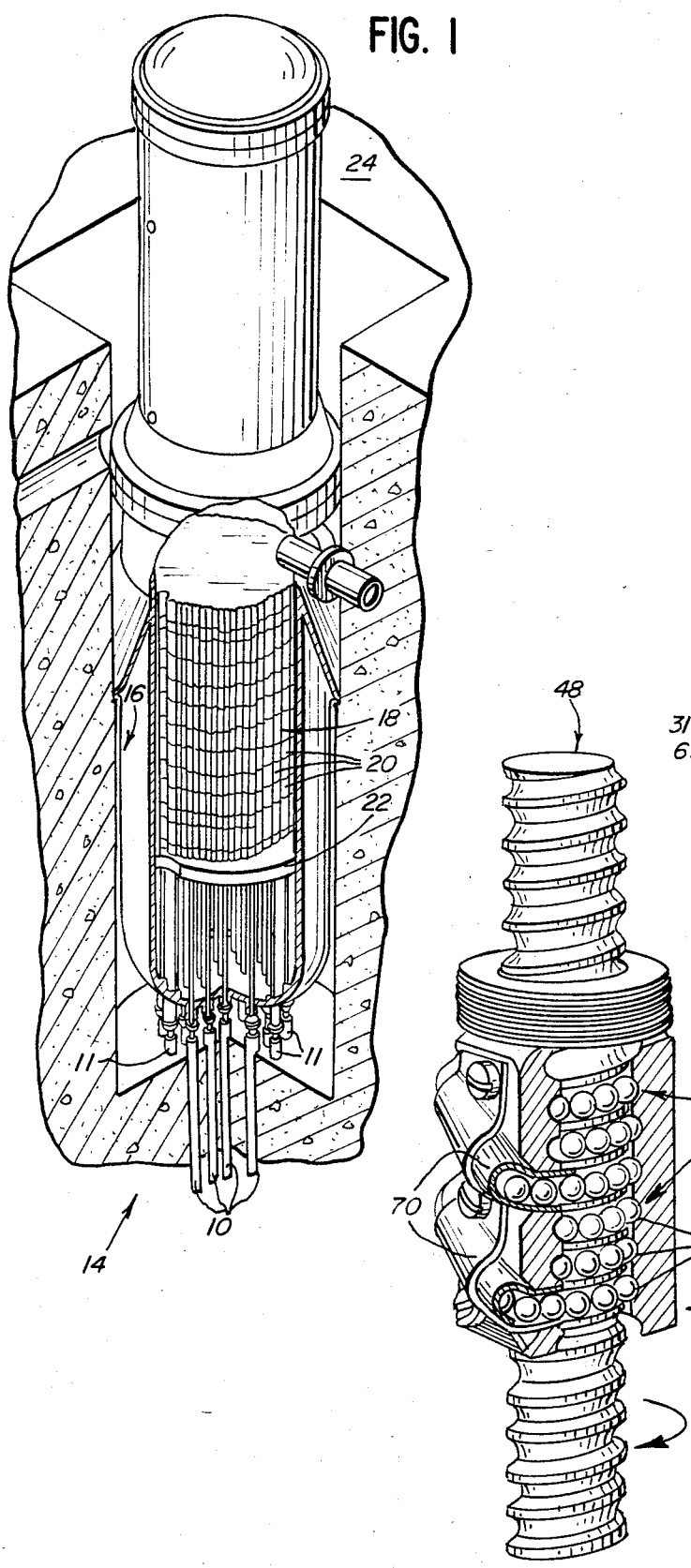
FIG. 1
FIG. 3
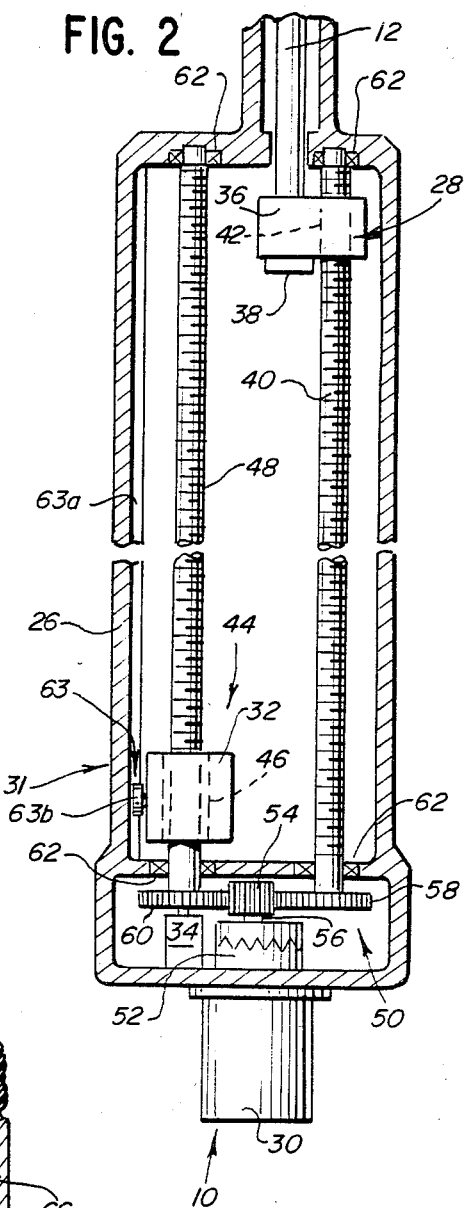
FIG. 2

CONTROL ROD DRIVE

BACKGROUND OF THE INVENTION

The Government has rights in this invention pursuant to Contract No. DE-AT03-76SF70046 awarded by the U.S. Department of Energy.

The present invention relates generally to nuclear reactors and more particularly to a control rod drive for inserting control rods into a reactor core and removing them therefrom.

Reactors commonly employ control rods which are inserted into the reactor core to control the level of the nuclear reaction. Control rods may be used during normal operation to maintain a desired level of neutron flux in the core, and additionally may provide a means for quickly shutting down the reactor in case of emergency. Under emergency conditions, when it is necessary to shut down the reactor, it may be desirable for control rods to be fully inserted relatively quickly into the reactor core. It will be appreciated that during a power failure it may be desirable to shut down the reactor, and an electrically-powered control rod drive might be rendered inoperable by failure of a source of electrical power.

Some known reactors have the control rods which are inserted into the core from above. In this type of reactor, gravity may be used directly to pull the control rods downward into the core during a power failure. In some relatively recently developed reactors, it has been found that desirable to utilize the space above the reactor core for heat exchange apparatus and the like. To avoid interference with such apparatus, it has been proposed to position the control rods beneath the core and insert them upwardly from below. Systems such as electric motor driven mechanisms powered by auxiliary batteries have been proposed to provide power for emergency rod insertion. Such systems have a shortcoming in that failure of their associated batteries or electrical systems may render them inoperable.

It is generally desirable that a mechanism used for emergency insertion of control rods be compact and relatively simple. Due to space limitation and other constraints imposed by the reactor design, certain types of conventional mechanisms may be unsuitable for use or may be of insufficient reliability for use in a control rod drive. Hydraulic systems, for example, may be subject to leakage or power failure, or may be subject to failure due to breakdown of hydraulic fluid in the radioactive environment.

SUMMARY OF THE INVENTION

In accordance with the present invention, a control rod drive is provided which uses gravitational force to insert one or more control rods automatically into a reactor core from below under emergency conditions without a source of electrical power. The control rod drive includes primary drive means, which may be electrically operated, for inserting or withdrawing a single control rod under normal operating conditions and emergency drive means operative to automatically insert the control rod into the reactor core under emergency conditions without relying on external power. The preferred emergency drive employs a weight mechanism to provide the necessary mechanical force to drive the control rod upward.

In the illustrated embodiment, a pair of rotatable screws operatively associated in timed relation by a transmission are employed to transmit forces between the weight and the control rod. The primary drive means include an electric motor connected to the transmission by an electrically activated clutch which disengages the motor from the transmission upon reduction of electrical power to the clutch below a predetermined level.

The control rod is mounted on a nut which has a bore engaging one of the screws so that rotation of the screw moves the nut axially thereof. The other screw extends through a bore in the counterweight so that gravitational forces on the counterweight which pull the counterweight downward cause the second screw to rotate. This rotation is transmitted to the first screw through the transmission to cause the control rod to travel upward as the weight is pulled downward. The preferred screws are ball screws, which operate with relatively little friction. Suitable guide means are provided for preventing rotation of the weight as the second screw rotates. A decelerator may also be employed to bring the control rod to a controlled stop when it reaches a predetermined position.

A typical nuclear reactor employs a plurality of control rods. Accordingly, in a nuclear reactor, a plurality of control rod drives in accordance with the present invention may be employed, with each control rod drive operating a single respective control rod. In the alternative, each control rod drive might be used to drive a plurality of separate control rods.

Accordingly, it is a general aspect of the present invention to provide a control rod drive for inserting one or more control rods upwardly into a reactor core from beneath the reactor core under emergency conditions.

Further aspects and features of the present invention are disclosed in the following description in the accompanying illustrations.

BRIEF DESCRIPTION OF THE DRAWINGS

FIG. 1 is a perspective view, with portions broken away for clarity, of a nuclear reactor employing control rod drives in accordance with the present invention.

FIG. 2 is a foreshortened partly diagrammatic, vertical sectional view of a control rod drive in accordance with the present invention.

FIG. 3 is an enlarged perspective view, with portions broken away for clarity, of a ball screw and ball nut used in the drive shown in FIG. 2.

DETAILED DESCRIPTION OF THE PREFERRED EMBODIMENT

The present invention is generally embodied in a control rod drive, indicated generally at 10, for selectively inserting or withdrawing one or more control rods 12 from a nuclear reactor core. Referring to FIG. 1, there is shown a high temperature gas-cooled reactor (HTGR), indicated generally at 14, having a plurality of control rod drives 10 in accordance with the present invention. The reactor may further include control rod drives 11 of other types which are not a part of this invention.

The reactor includes a vessel 16 enclosing a core 18 which comprises a plurality of fuel elements 20. The fuel elements 20 in the illustrated embodiments are stacked in an array and supported by a structural platform 22. The core has a plurality of vertical openings (not shown) formed in it to receive the control rods 12 inserted upwardly from beneath the core. The reactor vessel 16 is surrounded by thick walls 24 which provide a barrier to protect the surrounding environment from radiation emitted by the reactor 14. In the illustrated embodiment, each control rod 12 has associated with it a single control rod drive 10.

Referring particularly to FIG. 2, each control rod drive 10 is supported beneath the reactor core 18 by a support structure, indicated generally at 26. In each control rod drive 10 the control rod 12 is supported by control rod positioning means 28 and is movable between a lower position (not shown) wherein it is located substantially beneath the reactor core and an upper position (FIG. 2) wherein an upper portion (not shown) of the control rod 12 extends into the reactor core 18.

During normal operation, the control rod 12 may be raised or lowered by primary drive means 30 such as an electric motor operatively associated with the control rod positioning means 28. During emergency conditions, such as a power failure, it may be necessary to shut down the reactor 14 by inserting the control rods 12 into the core, without having the primary drive means 30 available.

In reactor configurations where the control rods are positioned above the core when withdrawn therefrom, gravity can be used directly to pull the control rods downwardly into the core during a power failure. In the illustrated configuration, however, the rods must be pushed upwardly into the core.

In accordance with the present invention, each control rod drive 10 includes emergency drive means 31 which uses gravitational force to insert one or more control rods upwardly into the reactor core 18 from below under emergency conditions. Herein, the emergency drive means 31 includes a weight 32 which is movable between an upper and a lower position and which is operatively associated with the control rod 12 so that when the weight 32 travels downwardly, the control rod 12 is pushed upwardly. To bring the control rod 12 to a controlled stop as it approaches a predetermined position during its upward travel, decelerator means 34 may be provided which enable the rod 12 to be inserted at a rapid rate of speed without subjecting the rod 12 and drive 10 to impact forces when the control rod 12 reaches the point of full insertion. In the illustrated embodiment, each control rod drive 10 is associated with a single control rod 12.

In the illustrated embodiment, control rod drives 11 are provided for driving control rods used to regulate the core flux level during normal operation of the reactor, and the control rod drives 10 having emergency drive means are used only for emergency insertion of their associated control rods for shutting down the reactor. Thus, in this embodiment, the primary drive means 30 would generally be used only for returning the control rod 12 to its withdrawn position following automatic insertion of the rod 12.

Turning now to a more detailed description of the preferred embodiment of the present invention, the control rod positioning means 28 preferably comprises a nut 36 fixed to the control rod 12 near its lower end 38 and a rotatable drive screw 40 extending through a bore 42 in the nut 36 to cooperate with the nut so that rotation of the screw 40 moves the nut 36 and control rod 12 axially of the screw 40. To operatively associate the movement of the weight 32 with that of the control rod, the weight is preferably supported by weight positioning means 44, which herein include a second nut 46 supported upon a second screw 48 so that axial movement of the weight 32 due to gravity causes the second screw 48 to rotate. Suitable transmission means, indicated generally at 50, are provided for maintaining a timed relationship between the rotational movements of the respective screws 40 and 48.

As mentioned above, the primary drive means 30 is operatively associated with the control rod positioning means 28. In the illustrated embodiment, this association is provided by the transmission means 50 through a clutch 52. The clutch 52 is preferably electrically operated so that it disengages automatically when power to the clutch 52 is reduced below a predetermined level.

If the internal friction of the primary drive means is sufficient, the weight 32 will be maintained by friction in its upper position when the clutch 52 is engaged. If the internal friction in the primary drive means 30 is not great enough to accomplish this, a spring biased brake (not shown) may be provided to immobilize the primary drive means 30 to maintain the weight 32 in its upper position when the clutch 52 is engaged. In either case, the clutch 52 herein functions as restraint means for maintaining the weight in its upper position when it is desired that the control rod 12 be maintained in its lower or withdrawn position.

The transmission means 50 in the illustrated embodiment comprises a pinion 54 mounted on the output shaft 56 of the clutch 52, a first gear 58 meshing with the pinion 54 and fixed to the drive screw 40, and a second gear 60 also meshing with the pinion and fixed to the second screw 48.

The screws 40 and 48 are rotatably supported by suitable bearings 62 near their upper and lower ends. To prevent the weight 32 from rotating, suitable guide means 63 are provided to enable the weight 32 to travel axially of the second screw 48 without rotating about the axis of the second screw 48. Herein, the guide means include a guide channel 63a extending generally parallel to the second screw 48 and a cam follower 63b rotatably mounted on the weight 32 and sized slightly smaller in diameter than the width of the guide channel 63a so as to roll in the channel as the weight 32 travels.

It will be appreciated that the operation of the weight 32 to raise the control rod 12 requires that the force of gravity on the weight 32 be great enough to pull it downward so that it imparts rotation to the screws 40 and 48. The weight must have sufficient mass not only to balance the gravitational force on the control rod 12, but also to overcome static friction to start the control rod 12 upward upon occurrence of a power failure. To provide relatively efficient operation, it is desirable that the control rod drive 10 operate with relatively low friction. To this end, the preferred screws 40, 48 and nuts 36, 46 are ball screws and ball nuts, which enable rotation of the screws to be translated into axial movement of the respective nuts and vice versa with relatively low friction.

The mass of the weight 32 and the pitch of the threads on the screws 40, 48 and nut 36, 46 are selected to enable the emergency drive means 31 to insert the control rod 12 at an acceptable rate of speed, without requiring unacceptably long screws to be used or imposing unacceptable power requirements on the primary drive means 32. The decelerator means 34 may comprise any known mechanical system for absorbing kinetic energy at a controlled rate, such as a dash pot which engages a portion of the weight 32 near the end of its downward travel so as to impede the motion of the weight and bring it to a controlled stop.

Referring particularly to FIG. 3, there is shown a detailed fragmentary view of the drive screw 48 and associated nut 36. In operation, weight supported by the nut 36 is transmitted to the screw 48 through a plurality of metal balls 64 in rolling contact, so that frictional forces are much less than those which would result from conventional screw-nut engagement. To illustrate the operation of the screw 48 and nut 36, when the screw 48 is rotated in the direction indicated in FIG. 3, the balls 64 roll downwardly along helical races 66 defined between the threads of the screw and the nut. As the balls reach the ends 68 of their associated races 66, they enter return tubes 70 and travel therethrough back to the upper ends (not shown) of their associated races.

From the foregoing, it will be appreciated that the present invention provides a novel control rod drive which enables control rods to be inserted upwardly into a reactor core from beneath the core during emergency conditions without the use of electrical power and which provides a counterbalancing effect to reduce the force required for upward insertion of the control rods under normal conditions. While a preferred embodiment has been described and illustrated, there is no intent to limit the scope of the invention to this or any other particular embodiment. The scope of the invention is defined by the spirit and language of the appended claims.

I claim:

1. A reactor core, one or more control rods, and a control rod drive for selectively inserting and withdrawing said one or more control rods into and from said reactor core, comprising:

a support structure secured beneath said reactor core;
control rod positioning means supported by said support structure for movably supporting said control rod for movement between a lower position wherein said control rod is located substantially beneath said reactor core and an upper position wherein at least an upper portion of said control rod extends into said reactor core;
transmission means;
primary drive means connected with said control rod positioning means by said transmission means for positioning said control rod under normal operating conditions;
emergency drive means for moving said control rod from said lower position to said upper position under emergency conditions, said emergency drive means including a weight movable between an upper and a lower position, means for movably supporting said weight, and means for transmitting gravitational force exerted on said weight to said control rod positioning means to move said control rod upwardly when said weight is pulled downwardly by gravity;
said transmission means connecting said control rod positioning means with said emergency drive means so that said primary drive means effects movement of said weight and said control rod in opposite directions under normal conditions, thus providing counterbalancing to reduce the force required for upward movement of said control rod under normal conditions; and
restraint means for restraining the fall of said weight under normal operating conditions and disengaging said primary drive means to release said weight under emergency conditions.

2. A control rod drive in accordance with claim 1 wherein said restraint means includes clutch means for disassociating said primary drive means from said control rod positioning means under emergency conditions to permit said emergency drive means to operate independently of said primary drive means.

3. A control rod drive in accordance with claim 2 wherein said clutch means comprises an electric clutch which is maintained in an engaged position during normal operating conditions by electric power, and which shifts automatically to disengaged position upon reduction of electrical power to the clutch below a predetermined level.

4. A control rod drive in accordance with claim 1 wherein said emergency drive means further comprises decelerator means for bringing said control rod to a controlled stop as the control rod approaches a predetermined position.

5. A control rod drive comprising:

a support structure;
a control rod;
control rod positioning means supported by said support structure movably supporting said control rod for movement between a lower position and an upper position;
transmission means;
primary drive means connected with said control rod positioning means by said transmission means for positioning said control rod under normal operating conditions;
emergency drive means for moving said control rod from said lower position to said upper position under emergency conditions, said emergency drive means including a weight movable between an upper and a lower position, means for movably supporting said weight, and means for transmitting gravitational force exerted on said weight to said control rod positioning means to move said control rod upwardly when said weight is pulled downwardly by gravity; and
said transmission means connecting said control rod positioning means with said emergency drive means so that said primary drive means effects movement of said weight and said control rod in opposite directions under normal conditions, thus providing counterbalancing to reduce the force required for upward movement of said control rod under normal conditions; and
restraint means for restraining the fall of said weight under normal operating conditions and disengaging said primary drive means to release said weight under emergency conditions.

6. A reactor core, one or more control rods, and a control rod drive for selectively inserting and withdrawing said one or more control rods into and from said reactor core, comprising:

a support structure secured beneath said reactor core;
control rod positioning means supported by said support structure for movably supporting said control rod for movement between a lower position wherein said control rod is located substantially beneath said reactor core and an upper position wherein at least an upper portion of said control rod extends into said reactor core, said control rod positioning means comprising a nut supporting said control rod, said nut having a threaded bore therethrough, and a rotatable drive screw extending through said bore to cooperate with said nut so that rotation of said screw moves said nut and said control rod axially of said drive screw;

transmission means;

primary drive means connected with said control rod positioning means by said transmission means for positioning said control rod under normal operating conditions;

emergency drive means for moving said control rod from said lower position to said upper position under emergency conditions, said emergency drive means including a weight movable between an upper and a lower position, means for movably supporting said weight, and means for transmitting gravitational force exerted on said weight to said control rod positioning means to move said control rod upwardly when said weight is pulled downwardly by gravity; and restraint means for restraining the fall of said weight under normal operating conditions and disengaging said primary drive means to release said weight under emergency conditions.

7. A control rod drive in accordance with claim 6 wherein said rotatable drive screw is a ball screw and wherein said nut is a ball nut.

8. A reactor, a control rod, and a control rod drive for inserting said control rod into said reactor core under emergency conditions, comprising:

a support structure secured beneath said reactor core for supporting said control rod, said control rod being movable between a lower position below said reactor core and an upper position wherein at least an upper portion of said control rod extends into said reactor core;

a first movable ball nut fixed to the control rod and having a bore formed therethrough;

a first ball screw extending through the bore of said first ball nut and engaging said bore so that rotation of said first ball screw displaces said first ball nut axially of said first ball screw, said first ball screw being axially constrained and rotatably supported by said support structure;

primary drive means for selectively imparting rotation to said first ball screw under normal operating conditions;

transmission means for transmitting mechanical power from said drive means to said first ball screw;

clutch means operative to disengage said primary drive means from said transmission means under emergency conditions; and emergency drive means for rapidly inserting said control rod into said reactor core under emergency conditions, said emergency drive means comprising a second ball screw axially constrained and rotatably supported by said support structure and connected with said transmission means so that rotation of said second ball screw causes rotation of said first ball screw, a weight having a threaded bore formed therethrough engaging said second ball screw so that downward movement of the weight due to gravity imparts rotation to said ball screws to drive the control rod upward, guide means for preventing rotation of said weight about the axis of said second ball screw while permitting movement of said weight axially of said second ball screw, and decelerator means for bringing said auxiliary drive means to a controlled stop after said control rod has been inserted to a predetermined position within the reactor core.

9. A control rod drive in accordance with claim 8 wherein said clutch means includes an output shaft, and said transmission means includes a pinion mounted upon said output shaft, a first gear meshing with said pinion and being fixed to said first ball screw, and a second gear meshing with said pinion and being fixed to said second ball screw.

* * * * *